United States Patent
Murata

(10) Patent No.: US 8,635,988 B2
(45) Date of Patent: Jan. 28, 2014

(54) VARIABLE VALVE DEVICE FOR INTERNAL COMBUSTION ENGINE

(75) Inventor: Shinichi Murata, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 714 days.

(21) Appl. No.: 12/940,236

(22) Filed: Nov. 5, 2010

(65) Prior Publication Data

US 2011/0107987 A1    May 12, 2011

(30) Foreign Application Priority Data

Nov. 6, 2009    (JP) .................................. 2009-254911

(51) Int. Cl.
*F01L 1/34*    (2006.01)
*F01L 1/04*    (2006.01)
*F01L 9/02*    (2006.01)

(52) U.S. Cl.
USPC ...................... 123/432; 123/90.15; 123/90.17

(58) Field of Classification Search
USPC .............. 123/432, 90.15, 90.16, 90.17, 90.31
See application file for complete search history.

(56) References Cited

U.S. PATENT DOCUMENTS

| 5,233,948 A | 8/1993 | Boggs et al. | |
| 5,497,737 A | 3/1996 | Nakamura | |
| 6,009,842 A * | 1/2000 | Hiereth | 123/90.27 |
| 6,885,976 B2 * | 4/2005 | Yoshiki et al. | 123/90.15 |
| 7,827,945 B2 | 11/2010 | Gregor et al. | |
| 8,538,662 B2 * | 9/2013 | Murata | 123/90.15 |
| 2007/0169732 A1 | 7/2007 | Hayase et al. | |

FOREIGN PATENT DOCUMENTS

| DE | 102005024485 A1 | 11/2006 |
| DE | 102005039751 A1 | 3/2007 |
| EP | 1870583 A1 | 12/2007 |
| JP | 60-150411 A | 8/1985 |
| JP | 2009-144521 A | 7/2009 |
| WO | WO 2007/022737 A1 | 3/2007 |

* cited by examiner

*Primary Examiner* — Hieu T Vo
(74) *Attorney, Agent, or Firm* — Birch, Stewart, Kolasch & Birch, LLP

(57) ABSTRACT

A variable valve device for an internal combustion engine includes a cam phase variable mechanism for varying a phase difference (split) between first and second intake cams. Under predetermined operating conditions of the internal combustion engine, the second intake cam is controlled to take a phase (split) (S1) which is within a predetermined pumping-loss reduction operation phase range and entails a minimum fluctuation (oscillation width) of drive torque on an intake camshaft.

3 Claims, 8 Drawing Sheets

VARIABLE VALVE DEVICE FOR INTERNAL COMBUSTION ENGINE

BACKGROUND OF THE INVENTION

1. Field of the Invention

This present invention relates to a variable valve device for internal combustion engines, and more particularly, techniques for optimizing valve opening/closing timings of intake and exhaust valves.

2. Description of the Related Art

In recent years, more and more internal combustion engines (engines) have come to be equipped with cam phase variable mechanisms as a variable valve device for varying valve opening/closing timings (cam phases). Also, techniques have been developed whereby the cam phase variable mechanisms are applied to an engine having each cylinder provided with a plurality of intake valves and the valve opening/closing timings of all intake valves as well as only some of the intake valves are varied (split) in accordance with the operating condition of the engine (Japanese Laid-open Patent Publication No. 2009-144521).

Where the valve opening/closing timings of only some of the intake valves associated with the individual cylinders can be varied in this manner, the multiple intake valves can be made to open continuously as a whole, whereby highly flexible valve control can be executed so that the overall valve open period of the intake valves may be prolonged, making it possible to improve the operational performance of the engine.

In general, it is preferable to set the closing timing of the intake valve to a most retarded position when the internal combustion engine is in a low speed and load state because pumping losses can be reduced by retarding the closing timing of the intake valve. Based on this view, according to the above-mentioned publication, when the internal combustion engine is in the low speed and load state as seen during start-up, idling, etc., one among a plurality of valves (one between two valves in this specification), whose opening/closing timing is variable, is controlled to the most retarded position.

However, the inventors' research discloses that, if one of the valves, whose opening/closing timing is variable, is controlled to the most retarded position as described above during an extremely low speed and load period after the warm-up of the internal combustion engine as in a hot idling state, this reduces pumping losses but incurs phenomena, such as unstable combustion and inefficient fuel consumption. It is undesirable to deteriorate combustion stability and fuel consumption during the extremely low speed and load period after the warm-up of the internal combustion engine. Considering that the idling is frequently conducted, a sufficient improvement cannot be seen in the operating performance of the internal combustion engine.

SUMMARY OF THE INVENTION

An object of the present invention is to provide a variable valve device for an internal combustion engine capable of preventing a reduction in combustion stability and fuel efficiency in pumping-loss reduction operations of the internal combustion engine, thereby improving performance of the internal combustion engine.

In order to accomplish the above object, the invention provides a variable valve device for an internal combustion engine comprising; a cam phase variable mechanism in which each cylinder includes a first intake valve driven by a first intake cam and a second intake valve driven by a second intake cam, the mechanism being capable of varying a phase of the second intake cam relative to the first intake cam, and a phase variable control unit that controls the cam phase variable mechanism, wherein the cam phase variable mechanism is formed by turnably disposing an inner camshaft in an outer camshaft formed of a pipe, has a intake camshaft that can be driven by crank output of the internal combustion engine, is provided with the first intake cam in a peripheral area of the outer camshaft, is provided with the second intake cam so as to be turnable around an axis of the outer camshaft, and varies the phase of the second intake cam on the basis of the first intake cam at a relative displacement of the outer and inner camshafts; and under predetermined operating conditions of the internal combustion engine, the phase variable control unit varies the phase of the second intake cam relative to the first intake cam such that the second intake cam takes a phase which is within a predetermined pumping-loss reduction operation phase range ensuring reduced pumping losses, the second intake cam is set in the predetermined pumping-loss reduction operation phase range by a predetermined phase that the driving torque of the intake camshaft becomes smallest.

The width of fluctuation of torque on the intake camshaft varies depending on the relative displacement of the inner camshaft relative to the outer camshaft. Greater fluctuation of torque leads to greater likelihood of transition from lubricant's fluid lubrication to boundary lubrication, and thus, increased friction on the intake camshaft. Thus, in pumping-loss reduction operations, if the second cam is controlled to take a phase entailing a minimum fluctuation of torque on the intake camshaft, it leads to reduced friction on the intake camshaft, which leads to increased combustion stability, and thus, increased fuel efficiency.

BRIEF DESCRIPTION OF THE DRAWINGS

The present invention will become more fully understood from the detailed description given hereinafter and the accompanying drawings which are given by way of illustration only, and thus, are not limitative of this invention, and wherein.

DETAILED DESCRIPTION OF THE PREFERRED EMBODIMENTS

Figure 1:
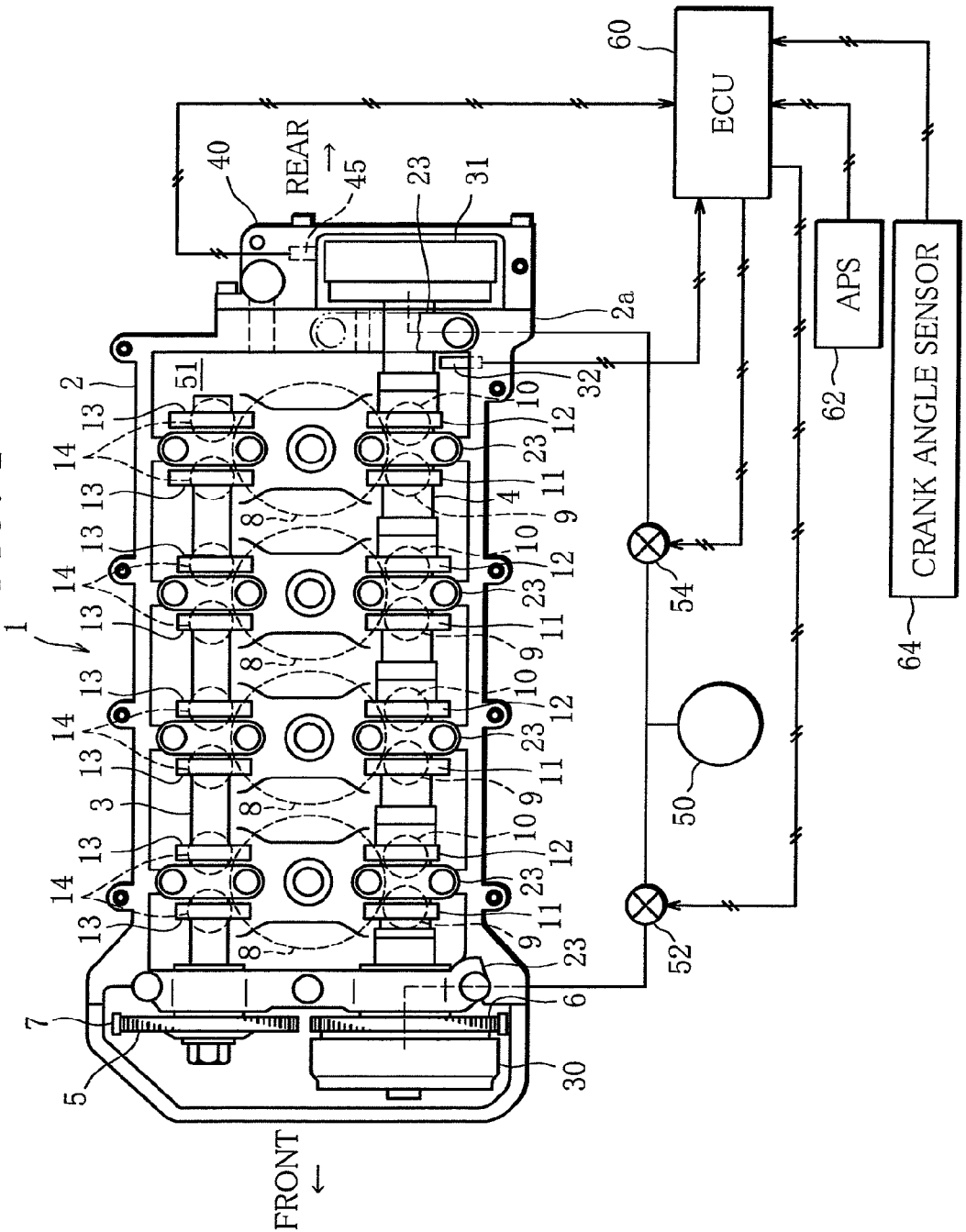
FIG. 1 illustrates a schematic construction of a variable valve device for an internal combustion engine according to the present invention.

Referring to the drawings attached, an embodiment of the present invention will be described.

FIG. 1 schematically illustrates the construction of a variable valve device for an internal combustion engine according to the present invention. More particularly, FIG. 1 is a top view showing the internal structure of a cylinder head 2 of an engine 1.

The engine 1 is, for example an in-line four-cylinder engine with a DOHC valve train. As seen in FIG. 1, an exhaust camshaft 3 and an intake camshaft 4, rotatably supported inside the cylinder head 2, have cam sprockets 5, 6 mounted thereon, respectively. The cam sprockets 5, 6 are connected to a crankshaft, not shown, by a chain 7.

For each cylinder 8 of the engine 1, two intake valves 9, 10 and two exhaust valves 14, 14 are provided. On the intake camshaft 4, first and second intake cams 11, 12 are provided alternately, and the two intake valves 9, 10 for each cylinder 8 are driven by the first and second intake cams 11, 12, respectively. The two exhaust valves 14, 14 for each cylinder 8 are driven by exhaust cams 13 fixed on the exhaust camshaft 3.

The intake camshaft 4 is a double-structured shaft consisting of a hollow outer camshaft and an inner camshaft arranged inside the outer camshaft. The inner camshaft is coaxially arranged inside the outer camshaft with a slight clearance. The inner and outer camshafts thus arranged are rotatably received in cam journals 23 provided at the cylinder head 2 of the engine 1.

Each first intake cam 11 is fixed to the outer camshaft. Each second intake cam 12 is seated on the outer camshaft and fixed to the inner camshaft by a fixing pin fitted through a circumferentially-extending through-hole formed in the outer camshaft. Consequently, the first intake cams 11 rotate with the outer camshaft, while the second intake cams 12 rotate with the inner camshaft, and the inner camshaft with the second intake cams 12 is allowed to turn relative to the outer camshaft.

The intake camshaft 4 is provided with a first cam phase variable mechanism 30 and a second cam phase variable mechanism ("cam phase variable mechanism" mentioned in claims) 31. The first and second cam phase variable mechanisms 30, 31 are each formed of a known vane-type hydraulic actuator, for example. The vane-type hydraulic actuator is composed of a vane rotor rotatably arranged inside a cylindrical housing (cover), and designed such that the relative displacement of the vane relative to the housing varies depending on the amount of a working fluid supplied from a hydraulic unit 50 to inside the housing via a solenoid-operated hydraulic valve 52 or 54, or in other words, the pressure of the working fluid inside the housing.

The first cam phase variable mechanism 30 is arranged at the front end of the intake camshaft 4, with the cam sprocket 6 fixed to the housing, and the outer camshaft fixed to the vane rotor.

The second cam phase variable mechanism 31 is arranged at the rear end of the intake camshaft 4, with the outer camshaft fixed to the housing, and the inner camshaft fixed to the vane rotor.

Consequently, the first cam phase variable mechanism 30 can vary the relative displacement of the outer camshaft relative to the cam sprocket 6, while the second cam phase variable mechanism 31 can vary the relative displacement of the inner camshaft relative to the outer camshaft, and therefore, the first cam phase variable mechanism 30 can vary the opening/closing timing of the first intake valves 9 and the opening/closing timing of the second intake valves 10, relative to the opening/closing timing of the exhaust valves 14, together, while the second cam phase variable mechanism 31 can vary the phase difference (amount of split) between the opening/closing timing of the first intake valves 9 and the opening/closing timing of the second intake valves 10.

To the cylinder head 2 is attached a first cam sensor 32 for detecting the actual relative displacement of the outer camshaft. The first cam phase variable mechanism 30 can be controlled by regulating the valve position of the hydraulic valve 52 on the basis of information from the first cam sensor 32.

The intake camshaft 4 extends through a rear wall 2a of the cylinder head 2, and the second cam phase variable mechanism 31 is arranged outside the cylinder head 2 and covered with an actuator cover 40.

To the actuator cover 40 is attached a second cam sensor 45 for detecting rotating timing of the vaned rotor of the second cam phase variable mechanism 31, thereby detecting the actual relative displacement of the inner camshaft.

Consequently, the actual relative displacement between the inner and outer camshafts can be obtained on the basis of information from the first and second cam sensors 32 and 45, and the second cam phase variable mechanism 31 can be controlled by regulating the valve position of the solenoid hydraulic valve 54 on the basis of the actual relative displacement thus obtained.

An electronic control unit (ECU) 60 controls the engine 1 in various aspects, and comprises a CPU, memory, etc. To the input of the ECU 60 are connected various sensors, such as an accelerator position sensor (APS) 62 for detecting the position of the accelerator of the engine 1, and a crank angle sensor 64 for detecting a crank angle, in addition to the aforementioned first and second cam sensors 32 and 45. To the output of the ECU 60 are connected various devices including the aforementioned solenoid hydraulic valves 52, 54. An engine load is obtained on the basis of accelerator position information from the APS 62, and an engine speed (rpm) Ne is obtained on the basis of crank angle information from the crank angle sensor 64.

Next, how the variable valve device for the internal combustion engine according to the present invention, structured as described above, functions will be described.

Figure 2:
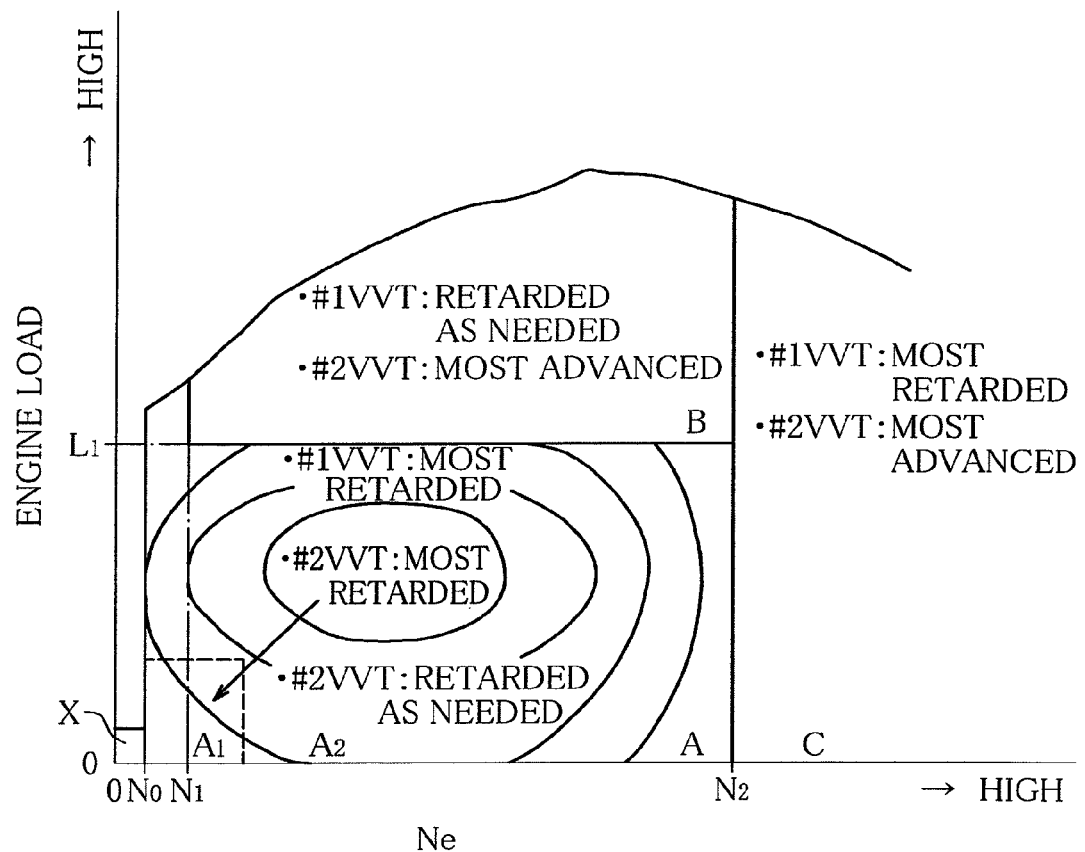
FIG. 2 illustrates a map used for controlling the operations of first and second cam phase variable mechanisms.

The ECU 60 ("phase variable control unit" in claims) controls the first and second cam phase variable mechanisms 30 and 31 according to a map shown in FIG. 2, on the basis of operating conditions of the engine 1, specifically engine load and engine speed Ne.

As seen in FIG. 2, the first and second cam phase variable mechanisms 30 and 31 are controlled depending on delimited operating regions of the engine 1, i.e., a start and warm-up operating region X, a low-speed low-load operating region A, a low-speed high-load operating region B, and a high-speed operating region C.

While the engine 1 is in the start and warm-up operating region X, in which hydraulic pressure supplied from the hydraulic unit 50 is insufficient, the first cam phase variable mechanism 30 (indicated as "1ST VVT" in the drawings) is held at the most retarded phase and the second cam phase variable mechanism (indicated as "2ND VVT" in the drawings) 31 is held at the most advanced phase, each by a lock pin.

In the operating region A, unlike in the start and warm-up operating region X, the first cam phase variable mechanism 30 is held at the most retarded phase and the second cam phase variable mechanism 31 is controlled to take a phase determined depending on the engine speed and load. Specifically, as long as the engine speed Ne is greater than or equal to a specified value N0 and less than a specified value N1, the hydraulic pressure supplied from the hydraulic unit 50 is low. For this reason, the first cam phase variable mechanism 30 is held at the most retarded phase by the lock pin or hydraulic pressure, while the second cam phase variable mechanism 31 is controlled to take a phase determined depending on the engine speed and load, considering that the second cam phase variable mechanism 31, which is arranged to vary the opening/closing timing of a smaller number of valves, compared with the first cam phase variable mechanism 30, is higher in controllability than the first cam phase variable mechanism 30. Also as long as the engine load is less than a specified value L1 and the engine speed Ne is greater than the value N1 and less than a specified value N2, the first cam phase variable mechanism 30 is held at the most retarded phase, while the second cam phase variable mechanism 31 is controlled to take a phase determined depending on the engine speed and load.

In the operating region B, the first cam phase variable mechanism 30 is controlled to take a retarded phase determined depending on the engine speed and load, while the second cam phase variable mechanism 31 is held at the most advanced phase. Specifically, as long as the engine load, which is obtained from accelerator position information from the APS 62, is greater than the value L1 and the engine speed Ne is greater than or equal to the value N1 and less than the value N2, the first cam phase variable mechanism 30 is controlled to take a retarded phase determined depending on the engine speed and load, while the second cam phase variable mechanism 31 is held at the most advanced phase.

In the operating region C, as in the operating region X, the first cam phase variable mechanism 30 is held at the most retarded phase, while the second cam phase variable mechanism 31 is held at the most advanced phase. Specifically, as long as the engine speed Ne is greater than or equal to the value N2, the first cam phase variable mechanism 30 is held at the most retarded phase, while the second cam phase variable mechanism 31 is held at the most advanced phase.

To sum up, in the low-load low-speed operating region A, the first cam phase variable mechanism 30 is fixed at the most retarded phase to allow the second cam phase variable mechanism 31 to be controlled preferentially. In the high-load low-speed operating region B, the second cam phase variable mechanism 31 is fixed at the most advanced phase to allow the first cam phase variable mechanism 30 to be controlled preferentially. In the high-speed operating region C, the first cam phase variable mechanism 30 is fixed at the most retarded phase and the second cam phase variable mechanism is fixed at the most advanced phase.

Fixing at least either of the first and second cam phase variable mechanisms 30 and 31 means that hydraulic pressure is never supplied to both the first and second cam phase variable mechanisms 30 and 31 simultaneously, or in other words, supply of hydraulic pressure can be limited to either of the first and second cam phase variable mechanisms 30 and 31. Consequently, in any of the operating regions A, B and C, fluctuations in hydraulic pressure are reduced, so that the first and second cam phase variable mechanisms 30 and 31 are both controlled stably and accurately.

This enables the first and second intake valves 9, 10 to be continuously, smoothly and freely operated, and thus, enables an extended intake valve "open" duration, which enables fine control of intake manifold pressure with satisfactorily reduced pumping losses, leading to increased engine output and reduced fuel consumption.

While in the central area of the low-load low-speed operating region A, the second cam phase variable mechanism 31 is held at the most retarded phase, in the peripheral area of the operating region A, the second cam phase variable mechanism 31 is controlled to take less retarded phase for the engine load and speed farther away from the center of the region A, as indicated by an arrow.

Further, as indicated by a broken line in FIG. 2, the operating region A is divided into an extremely low-load extremely low-speed operating region A1 and the rest A2. The operating region A1 is an extremely low-speed extremely low-load operating region after warm-up ("predetermined extremely low-speed extremely low-load operating region" in claims) and includes a warm idling operating region, while the operating region A2 is a normal low-speed low-load operating region.

The extremely low-speed extremely low-load operating region A1 is included in the peripheral area of the operating region A, not the central area thereof. Consequently, in the extremely low-speed extremely low-load operating region A1, the first cam phase variable mechanism 30 is held at the most retarded phase, while the second cam phase variable mechanism 31 is controlled to take a retarded phase determined depending on the engine speed and load within a phase range ensuring pumping-loss reduction operation, or operation with satisfactorily reduced pumping losses ("predetermined pumping-loss reduction operation phase range" in claims; phase (split) range of 20° to 90°, for example).

Figure 3A:
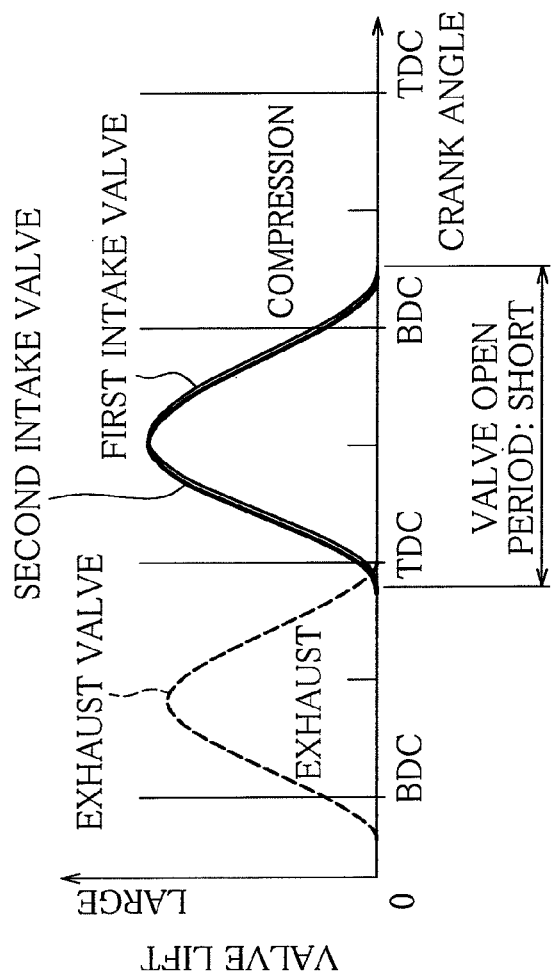
FIGS. 3(a), 3(b) and 3(c) individually illustrate the relationship of the crank angle of the engine with the lift amounts of first and second intake valves and an exhaust valve during the execution of operation control in a low-speed, low-load region.
Figure 3B:
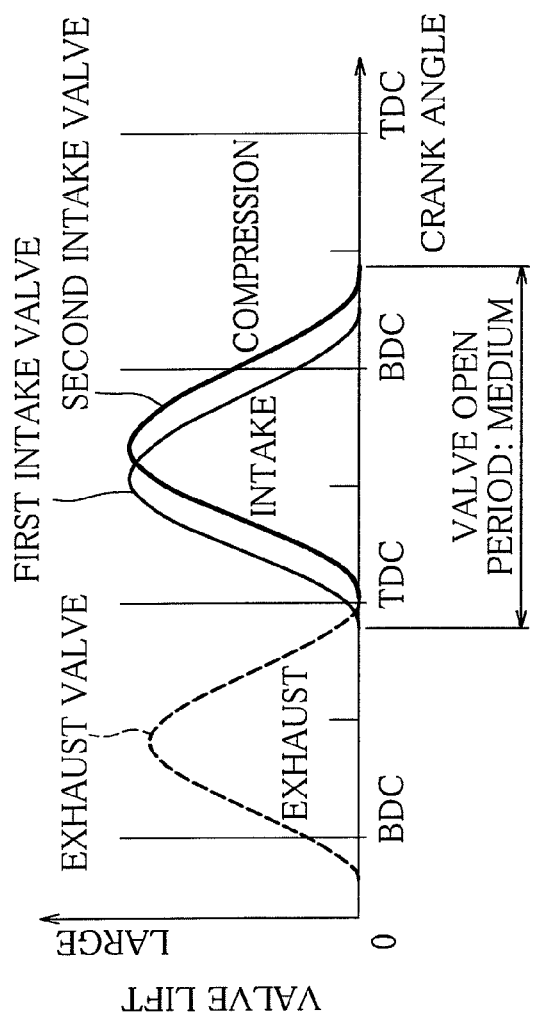
Figure 3C:
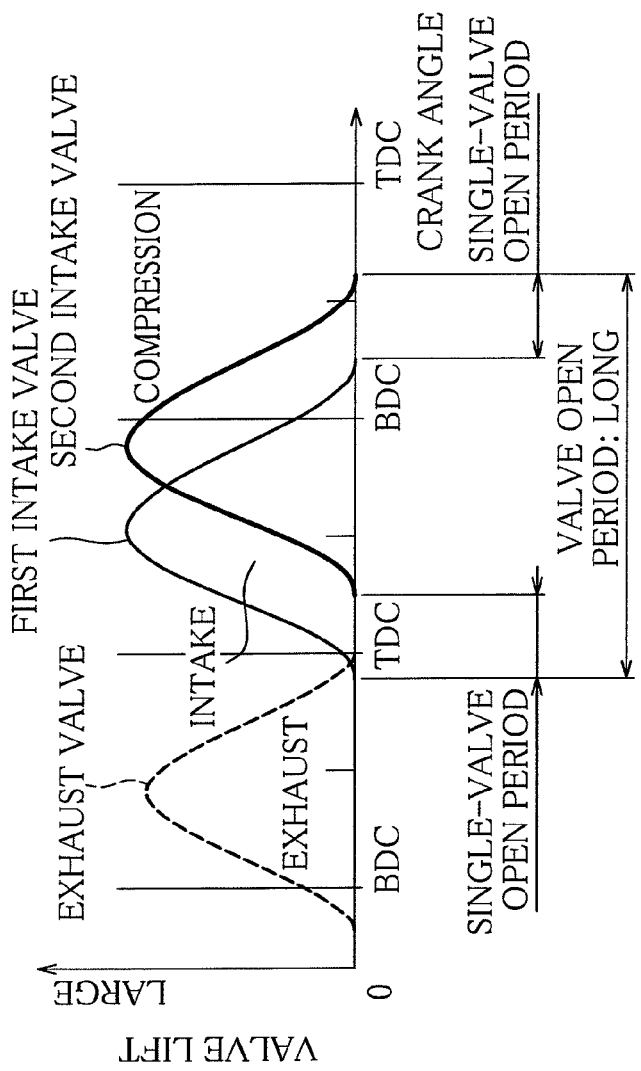

FIG. 3 shows how the lift of the first intake valve 9, the second intake valve 10 and the exhaust valve 14 varies with crank angle, by control in the operating region A. In FIG. 3(a), the second cam phase variable mechanism 31 is at the most advanced phase, as in the start and warm-up operating region X, so that the second intake valve 10 closes at a less retarded point. This increases the actual compression ratio, thereby increasing ignition performance and combustion stability. FIG. 3(b) is the case in which the engine 1 is in the extremely low-speed extremely low-load operating region A1, so that the second cam phase variable mechanism 31 is controlled to take a retarded phase determined depending on the engine speed and load within the pumping-loss reduction operation phase range, so that the second intake valve closes at a more retarded point. This not only reduces pumping losses, but also increases combustion stability and thus, fuel efficiency, because staggered "open" periods of the first and second intake valves offers strengthened flow inside the cylinder and such intake valve closing timing offers balanced actual compression ratio. FIG. 3(c) is the case in which the engine 1 is in the central area of the operating region A, which is included in the operating region A2, so that the second cam phase variable mechanism 31 is held at the most retarded phase to maximize the split, or phase difference between the opening/closing timing of the first intake valve 9 and the opening/closing timing of the second intake valve 10. This minimizes the actual compression ratio (due to late closing of the intake valve), minimizes the pumping losses, strengthens flow in the cylinder, and thus, increases fuel efficiency.

As stated above, in the extremely low-speed extremely low-load operating region A1, the second cam phase variable mechanism 31 is controlled to take a retarded phase determined depending on the engine speed and load within the pumping-loss reduction operation phase range. This is because it has been confirmed that if the second cam phase variable mechanism 31 is held at the most retarded phase within the pumping-loss reduction operation phase range to maximize the split between the first intake valve 9 and the second intake valve 10, it tends to result in reduced combustion stability, and thus, reduced fuel efficiency.

The reason for the phenomenon that the second cam phase variable mechanism 31 held at the most retarded phase within the pumping loss reduction operation phase range leads to reduced fuel efficiency is thought to be found in an increase in friction caused by transition of lubricant's lubrication mode on the intake camshaft 4 and the intake valves 9, 10, which will be explained below.

Figure 4:
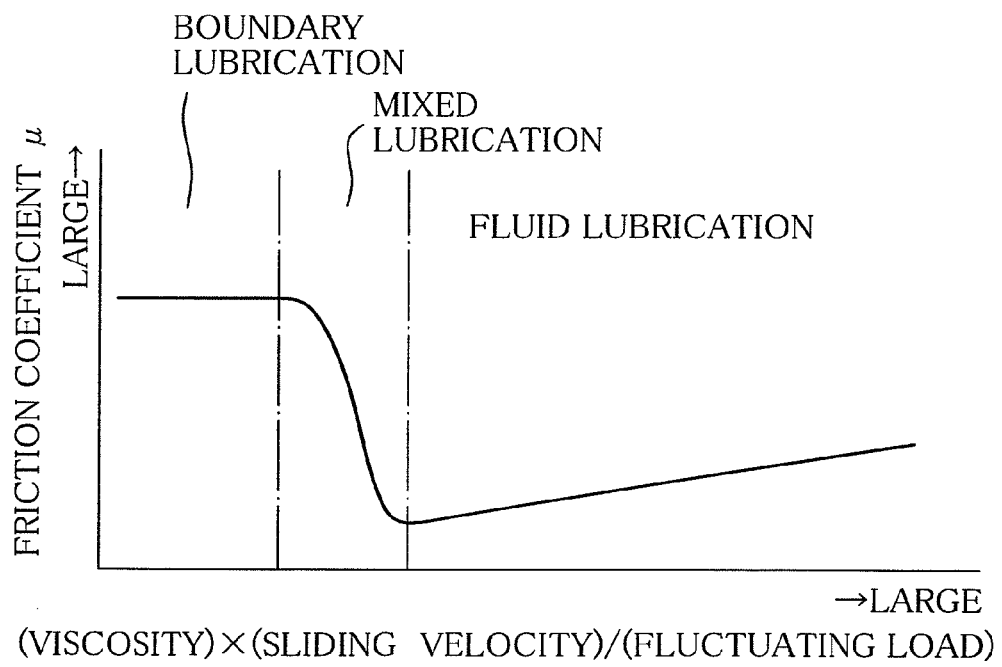
FIG. 4 is a Stribeck diagram.

Referring to FIG. 4, there is illustrated what is called a Stribeck diagram showing the relationship of the viscosity of lubricating oil, sliding velocity and fluctuating load {(viscosity)×(sliding velocity)/(fluctuating load)} with the state of lubrication. As seen from FIG. 4, the smaller the viscosity of the lubricating oil or the lower the sliding velocity or the larger the fluctuating load, the state of lubrication changes from fluid lubrication to mixed lubrication or further to boundary lubrication, with the result that the friction coefficient $\mu$ increases.

Figure 5:
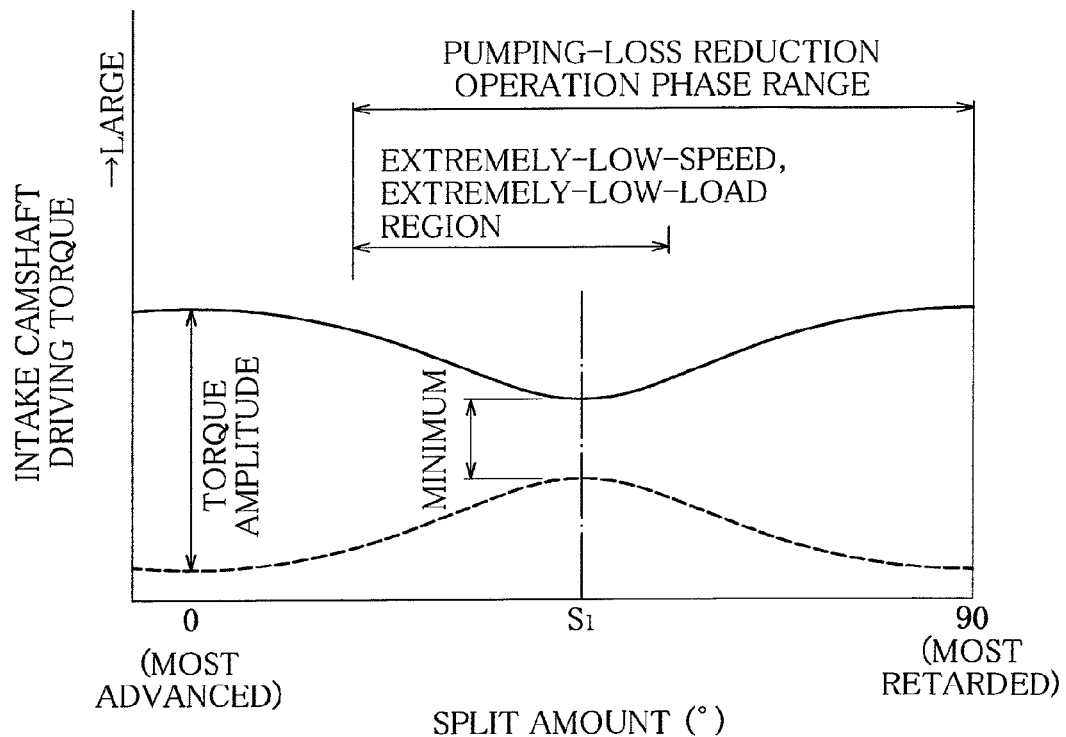
FIG. 5 illustrates the relationship of the amount of split between the first and second intake valves with torque applied to an intake camshaft.

In the extremely low-speed extremely low-load operating region, the intake camshaft 4 driven produces a fluctuating load. FIG. 5 shows how the maximum value (solid line) and minimum value (broken line) of oscillating drive torque on the intake camshaft 4 vary depending on the split between the first and second intake cams 11, 12. FIG. 5 shows that the width of oscillation of the drive torque on the intake camshaft 4, and thus, the fluctuating load, is smallest at a split S1.

In consideration of the relation shown in FIG. 4, at the split S1 entailing a minimum fluctuation of the intake camshaft 4 drive torque, and thus, of the load, the likelihood of fluid lubrication being maintained is high. Thus, the coefficient $\mu$ of friction is kept low, so that the maximum load on a sliding part of a camshaft-driving transmission system, such as a chain, as well as the maximum load on a bearing that supports a shaft driven by the transmission system are reduced, resulting in reduced drive friction and improved fuel efficiency.

As stated above, in the extremely low-speed extremely low-load operating region, fuel consumption of the engine 1 can be reduced by controlling the second cam phase variable mechanism 31 to take a phase (split S1) which is within the pumping-loss reduction operation phase range and results in small drive friction and maximum fuel efficiency.

Although in the above description, only the drive torque on the intake camshaft 4 is taken into consideration, combined drive torque on the exhaust and intake camshafts 3, 4 may be taken into consideration.

Figure 6:
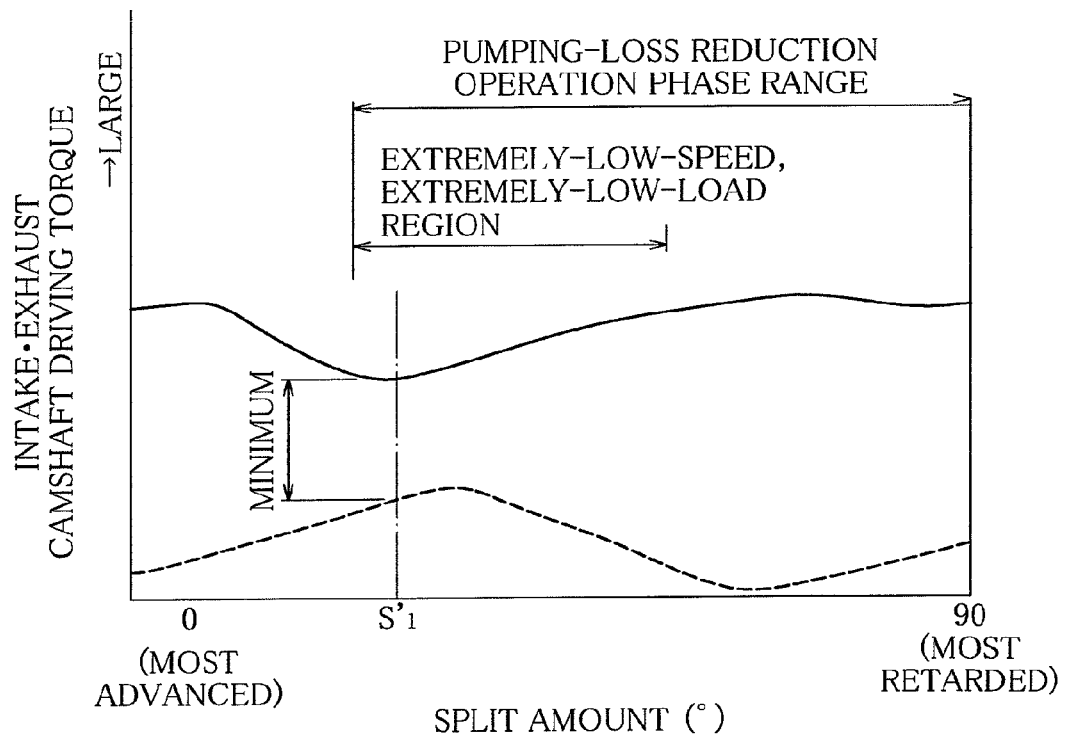
FIG. 6 illustrates the relationship of the amount of split between the first and second intake valves with torque applied to an intake and an exhaust camshaft.

Specifically, FIG. 6, similar to FIG. 5, shows how the maximum value (solid line) and minimum value (broken line) of combined drive torque on the exhaust and intake camshafts 3, 4 vary depending on the split (phase difference) between the first and second intake valves 9, 10. FIG. 6 shows that the width of oscillation of the combined torque on the exhaust and intake camshafts 3, 4, and thus, the load fluctuation is smallest at a split S1'.

Consequently, in the extremely low-speed extremely low-load operating region, fuel consumption of the engine 1 can be reduced by controlling the second cam phase variable mechanism 31 to take a phase (split S1') which is within the pumping-loss reduction operation phase range and results in small valve-drive friction and maximum fuel efficiency.

In the above, the variable valve device for the internal combustion engine according to an embodiment of the present invention has been described. The present invention is however not limited to the above-described embodiment.

For example, in the above embodiment, in addition to the second cam phase variable mechanism 31 for varying the phase difference (split) between the opening/closing timing of the first intake valves 9 and the opening/closing timing of the second intake valves 10, there is provided a first cam phase variable mechanism 30 for varying the opening/closing timing of the first intake valves 9 and the opening/closing timing of the second intake valve 10, together; the present invention is however satisfactorily applicable to engines provided with only the second cam phase variable mechanism 31.

Further, in the above-described embodiment, the engine 1 is an in-line four-cylinder engine with a DOHC valve train; the engine 1 is however not limited to the in-line type but may be a V type, and the number of cylinders is not limited to four, although the engine 1 needs to have a DOHC valve train.

What is claimed is:

1. A variable valve device for an internal combustion engine comprising;
   a cam phase variable mechanism in which each cylinder includes a first intake valve driven by a first intake cam and a second intake valve driven by a second intake cam, the mechanism being capable of varying a phase of the second intake cam relative to the first intake cam, and
   a phase variable control unit that controls the cam phase variable mechanism, wherein:
   the cam phase variable mechanism is formed by turnably disposing an inner camshaft in an outer camshaft formed of a pipe, has a intake camshaft that can be driven by crank output of the internal combustion engine, is provided with the first intake cam in a peripheral area of the outer camshaft, is provided with the second intake cam so as to be turnable around an axis of the outer camshaft, and varies the phase of the second intake cam on the basis of the first intake cam at a relative displacement of the outer and inner camshafts; and
   under predetermined operating conditions of the internal combustion engine, the phase variable control unit varies the phase of the second intake cam relative to the first intake cam such that the second intake cam takes a phase which is within a predetermined pumping-loss reduction operation phase range ensuring reduced pumping losses,
   the second intake cam is set in the predetermined pumping-loss reduction operation phase range by a predetermined phase that the driving torque of the intake camshaft becomes smallest.

2. The variable valve device for the internal combustion engine according to claim 1, wherein
   the variable valve device further comprises an exhaust valve provided for each cylinder and driven by an exhaust cam, and an exhaust camshaft arranged to be driven by crank output of the internal combustion engine, each exhaust cam being provided on the outer surface of the exhaust camshaft, and
   under predetermined operating conditions of the internal combustion engine, the phase variable control unit varies the phase of the second intake cam relative to the first intake cam such that the second intake cam takes a phase which is within the predetermined pumping-loss reduction operation phase range and entails a minimum fluctuation of combined drive torque on the intake and exhaust camshafts.

3. The variable valve device for the internal combustion engine according to claim 1, wherein
   in a predetermined extremely low-speed extremely low-load operating region of the internal combustion engine, the phase variable control unit controls the second intake cam to take a phase which is within the predetermined pumping-loss reduction operation phase range and entails a minimum fluctuation of drive torque on the intake camshaft or combined drive torque on the intake and exhaust camshafts.

* * * * *